US012045931B2

(12) United States Patent
Semmandampalayam Muthusamy et al.

(10) Patent No.: US 12,045,931 B2
(45) Date of Patent: Jul. 23, 2024

(54) METHOD AND ELECTRONIC DEVICE FOR SELECTIVE MAGNIFICATION IN THREE DIMENSIONAL RENDERING SYSTEMS

(71) Applicant: SAMSUNG ELECTRONICS CO., LTD., Suwon-si (KR)

(72) Inventors: Govindaraju Semmandampalayam Muthusamy, Bangalore (IN); Nachiketa Das, Bengaluru (IN); Ajay Surendranath, Bangalore (IN); Raghavan Velappan, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 33 days.

(21) Appl. No.: 17/864,123

(22) Filed: Jul. 13, 2022

(65) Prior Publication Data

US 2022/0343588 A1  Oct. 27, 2022

Related U.S. Application Data

(63) Continuation of application No. PCT/KR2022/004813, filed on Apr. 4, 2022.

(30) Foreign Application Priority Data

Apr. 14, 2021 (IN) .............................. 202141017348
Nov. 17, 2021 (IN) .............................. 202141017348

(51) Int. Cl.
*G06T 15/20* (2011.01)
*G06F 3/0482* (2013.01)
*G06T 19/00* (2011.01)
*G06T 19/20* (2011.01)

(52) U.S. Cl.
CPC ............ *G06T 15/20* (2013.01); *G06F 3/0482* (2013.01); *G06T 19/006* (2013.01); *G06T 19/20* (2013.01); *G06F 2203/04806* (2013.01)

(58) Field of Classification Search
None
See application file for complete search history.

(56) References Cited

U.S. PATENT DOCUMENTS

| 8,717,360 B2 | 5/2014 | Vesely et al. |
| 9,213,405 B2 | 12/2015 | Perez et al. |
| 9,594,489 B2 | 3/2017 | Niranjani et al. |
| 2007/0268317 A1 | 11/2007 | Banay |

(Continued)

OTHER PUBLICATIONS

Abdelkader Bellarbi et al., "Design and Evaluation of Zoom-based 3D Interaction Technique for Augmented Reality", ResearchGate, DOI: 10.1145/3110292.3110310, Mar. 2017, 5 pages total.

(Continued)

*Primary Examiner* — Edward Martello
(74) *Attorney, Agent, or Firm* — Sughrue Mion, PLLC (57) ABSTRACT

A method for selective magnification in a 3D rendering system includes: displaying, by an electronic device, a first view including at least one real world object and at least one virtual object; displaying, by the electronic device, a second view comprising a region of interest (ROI) in the first view, while displaying the first view; receiving, by the electronic device, a user interaction on the second view; and generating, by the electronic device, interaction on the first view corresponding to the user interaction received on the second view.

14 Claims, 7 Drawing Sheets

(56) References Cited

U.S. PATENT DOCUMENTS

| | | |
|---|---|---|
| 2013/0120365 A1 | 5/2013 | Lee et al. |
| 2015/0358614 A1 | 12/2015 | Jin |
| 2018/0121083 A1 | 5/2018 | Jiao et al. |
| 2018/0359462 A1 | 12/2018 | Shinohara |
| 2020/0081555 A1* | 3/2020 | Powderly .............. G06F 3/0482 |
| 2020/0082600 A1* | 3/2020 | Jones .................... G06T 19/006 |
| 2020/0402310 A1 | 12/2020 | Nidaira et al. |
| 2021/0041944 A1* | 2/2021 | Park ........................ G06F 3/011 |

OTHER PUBLICATIONS

International Search Report and Written Opininon dated Jun. 30, 2022 issued by the International Searching Authority in International Application No. PCT/KR2022/004813 (PCT/ISA/220, PCT/ISA/210, and PCT/ISA/237).

\* cited by examiner

METHOD AND ELECTRONIC DEVICE FOR SELECTIVE MAGNIFICATION IN THREE DIMENSIONAL RENDERING SYSTEMS

CROSS-REFERENCE TO RELATED APPLICATIONS

This application is a bypass continuation application of PCT/KR2022/004813 filed on Apr. 4, 2022, which is based on and claims priority to Indian Provisional Patent Application No. 202141017348 filed on Apr. 14, 2021, and Indian Complete Patent Application No. 202141017348 filed on Nov. 17, 2021, the disclosures of which are incorporated by reference herein in their entireties.

BACKGROUND

1. Field

The disclosure relates to an electronic device, and more specifically to a method and the electronic device for selective magnification in a three-dimensional (3D) rendering system.

2. Description of Related Art

Figure 1:
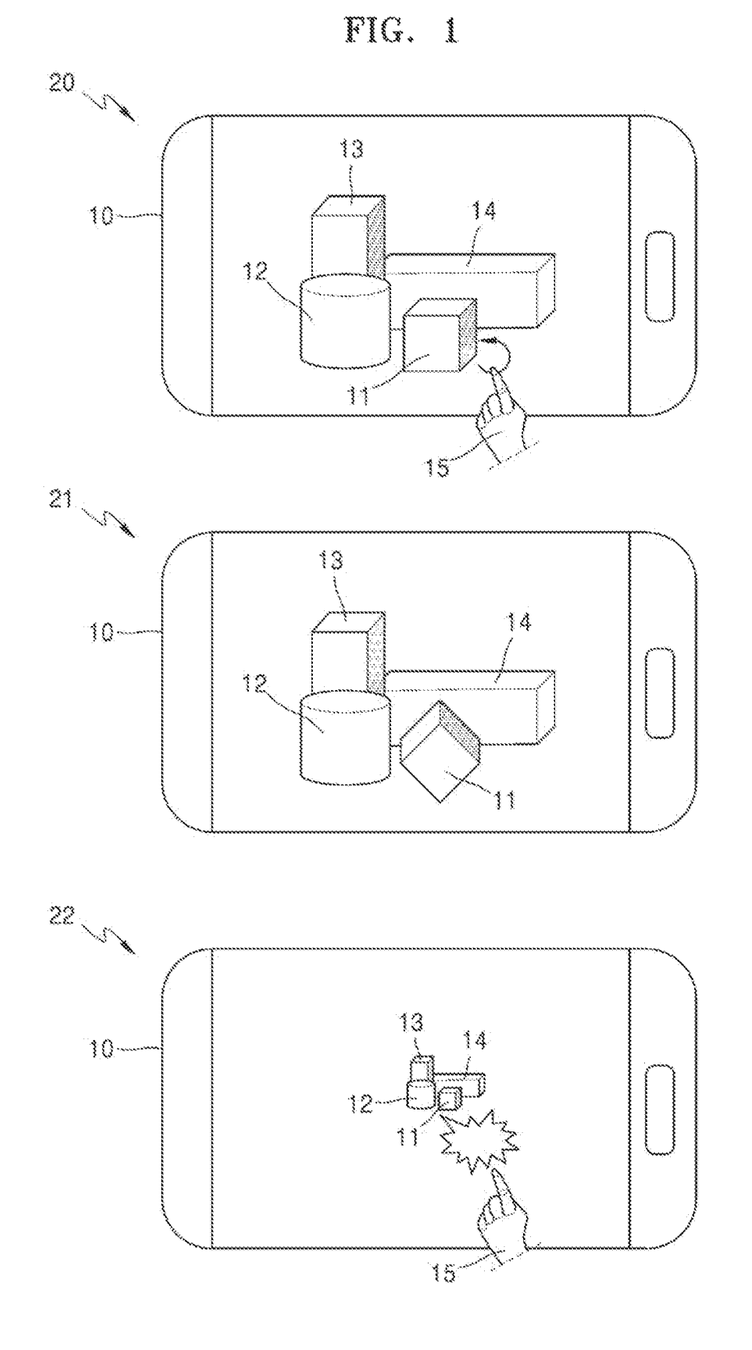
FIG. 1 illustrates an example scenario of interacting by the user with a virtual object in the 3D rendering systems, according to a related art.

Extended Reality (XR), Augmented Reality (AR), and Mixed Reality (MR) are few examples of 3D rendering technologies that blend real and virtual worlds and allow them to interact in real time to produce new live environments and visualizations, as well as a complete immersive experience to a user. FIG. 1 illustrates an example scenario of interacting by the user with a virtual object in a 3D rendering system. As shown in 20 of FIG. 1, an AR/XR/MR device 10 such as an AR glass, a VR headset, AR display systems like vehicle wind shield/door-glass, etc. includes the 3D rendering system, that displays an augmented virtual object 11 along with real world objects 12, 13, and 14, where all the objects 11 to 14 are close to a user 15. The user 15 can easily view and differentiate all the objects 11 to 14 and separately interact with the augmented virtual object 11. As shown in 21 of FIG. 1, the AR/XR/MR device 10 changes an orientation of the augmented virtual object 11 based on a user interaction.

As shown in 22 of FIG. 1, the AR/XR/MR device 10 displays the augmented virtual object 11 along with the real world objects 12 to 14, where all the objects 11 to 14 are far away from the user 15. Unlike the scenario explained in 20, the user 15 feels difficulty in viewing and differentiating all the objects 11 to 14 and separately interacting with the augmented virtual object 11, as all the objects 11 to 14 appear very small to the user. The user needs to physically move towards the objects 11 to 14 for obtaining an enlarged view of the objects 11 to 14 and differentiating the objects 11 to 14, which is not practical when an obstruction is present in front of the user, or the user wishes to stay at one point, or when the user has disabilities to move. Moreover, the method of moving towards the objects 11 to 14 worsens a user's interest in experiencing the 3D rendering systems. Thus, it is desired to at least provide a useful alternative.

SUMMARY

Provided are a method and an electronic device for selective magnification in an AR scene area. When the objects (i.e. real world and/or virtual objects) in a first view of a 3D scene are far away from a user, then the electronic device provides an enlarged/close-up view (i.e. second view) of a Region of Interest (ROI) contains the objects or portions of the objects in the ROI of the 3D scene closer to the user. The user perceives the enlarged/close-up view of the ROI that the user is located near to the ROI or a camera of the electronic device is placed near to the ROI. The electronic device displays the enlarged/close-up view alongside the first view without losing a sense of space and depth, allowing the user to maintain user's perspective view on a physical/real world and enhancing a user experience towards the physical/real world. As a result, the method provides an option to the user for conveniently and precisely interact with the objects in the enlarged/close-up view.

Another aspect of the embodiments herein is to overlay the second view on top of the first view with minimal overlap and render both the objects and surrounding 3D environment of the ROI to preserve the original 3D scene. The electronic device determines an amount of overlap of the second view on top of the first view based on a distance of the object at which the user preferred to see and the object in a focus of a camera of the electronic device. The electronic device automatically allows the user to customize a position of the second view over the first view in such way that the user can move around the second view to a convenient space attached to a user's view angle area as a sticky view. Moreover, the electronic device automatically configures the position of the second view over the first view based on the minimal overlap with the objects in the first view.

Another aspect of the embodiments herein is to enable the interaction on the second view propagated to the object of interaction in the original 3D scene, where the second view utilizes a mix of real time and offline spatial mapping and understanding details.

Another object of the embodiments herein is to provide user movement towards a zoomed second view area, where the second view merges with the first view if both zoom or interaction level or distance becomes almost same.

Accordingly, the embodiments herein provide a method for selective magnification in a 3D rendering system. The method includes displaying, by an electronic device, a first view including real world objects and virtual objects. The method includes displaying, by the electronic device, a second view comprising a Region of Interest (ROI) in the first view while displaying the first view. The method includes receiving, by the electronic device, user interaction on the second view. The method includes generating, by the electronic device, interaction on the first view corresponding to the user interaction received on the second view.

In an embodiment, where the 3D rendering system includes an extended reality system, an augmented reality system, and a mixed reality system.

In an embodiment, where displaying, by the electronic device, the ROI in the first view as the second view near to the user while preserving the first view, includes receiving, by the electronic device, a user input to select the ROI from the first view, wherein the user input including a touch input, or a gesture, or a voice input, selecting, by the electronic device, the ROI from the first view based on the user input, and overlaying, by the electronic device, a magnified view of the selected ROI over the first view as the second view.

In an embodiment, where displaying, by the electronic device, the ROI in the first view as the second view near to the user while preserving the first view, includes predicting, by the electronic device, a user intent to select the ROI from the first view based on a user interaction history, selecting, by the electronic device, the ROI from the first view based on the user intent, and overlaying, by the electronic device, a magnified view of the selected ROI over the first view as the second view.

In an embodiment, where displaying, by the electronic device, the ROI in the first view as the second view near to the user while preserving the first view, includes determining, by the electronic device, a context including an object in focus, selecting, by the electronic device, the ROI from the first view based on the context, and overlaying, by the electronic device, a magnified view of the selected ROI over the first view as the second view.

In an embodiment, where overlaying, by the electronic device, the magnified view of the selected ROI over the first view as the second view, includes identifying, by the electronic device, a position of the second view to overlay on the first view, determining, by the electronic device, a size of the second view to overlay on the first view, and overlaying, by the electronic device, the second view on the first view based on the identified position and the determined size.

In an embodiment, where the user interaction includes a touch interaction, a gesture-based interaction, and a voice sensor based interaction, an IoT device based interaction or any other multi-modality interaction.

Accordingly, the embodiments herein provide the electronic device for selective magnification in the 3D rendering system. The electronic device includes a selective magnification controller, a memory, a processor, and a display, where the selective magnification controller is coupled to the memory, the processor, and the display. The selective magnification controller is configured to control the display to display the first view including the real world objects and the virtual objects. The selective magnification controller is configured to control the display to display the second view comprising the ROI in the first view while displaying the first view. The selective magnification controller is configured for receiving the user interaction on the second view. The selective magnification controller is configured for generating the interaction on the first view corresponding to the user interaction received on the second view.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments, and the embodiments herein include all such modifications.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiments herein provide a method for selective magnification in a 3D rendering system. The method includes displaying, by an electronic device, a first view including real world objects and virtual objects. The method includes displaying, by the electronic device, a Region of Interest (ROI) in the first view as a second view near to a user while preserving the first view. The method includes receiving, by the electronic device, user interaction on the second view. The method includes generating, by the electronic device, interaction on the first view corresponding to the user interaction received on the second view.

Accordingly, the embodiments herein provide the electronic device for selective magnification in the 3D rendering system. The electronic device includes a selective magnification controller, a memory, a processor, where the selective magnification controller is coupled to the memory and the processor. The selective magnification controller is configured for displaying the first view including the real world objects and the virtual objects. The selective magnification controller is configured for displaying the ROI in the first view as the second view near to the user while preserving the first view. The selective magnification controller is configured for receiving the user interaction on the second view. The selective magnification controller is configured for generating the interaction on the first view corresponding to the user interaction received on the second view.

Unlike related art methods and systems, when the objects (i.e. real world and/or virtual objects) in the first view of a 3D scene are far away from the user, the proposed electronic device provides an enlarged/close-up view (i.e. second view) of the ROI contains the objects or portions of the objects in the ROI of the 3D scene closer to the user. The user perceives the enlarged/close-up view of the ROI that the user is located near to the ROI or a camera of the electronic device is placed near to the ROI. The electronic device displays the enlarged/close-up view alongside the first view without losing a sense of space and depth, allowing the user to maintain user's perspective view on a physical/real world and enhancing a user experience towards the physical/real world. As a result, the method provides an option to the user for conveniently and precisely interact with the objects in the enlarged/close-up view. The enlarged/close-up view can be achieved with real-time second view generation and offline spatial map/spatial understanding details. The offline spatial map/spatial understanding details can be bundled within the electronic device or an external device or a cloud storage.

Unlike related art methods and systems, the electronic device overlays the second view on top of the first view with minimal overlap and render both the objects and surrounding 3D environment of the ROI to preserve the original 3D scene. The electronic device determines an amount of overlap of the second view on top of the first view based on a distance of the object at which the user preferred to see and the object in a focus of a camera of the electronic device. The electronic device automatically allows the user to customize a position of the second view over the first view in such a way that the user can move around the second view to a convenient space attached to a user's view angle area as a sticky view. Moreover, the electronic device automatically configures the position of the second view over the first view based on the minimal overlap with the objects in the first view.

Unlike related art methods and systems, the electronic device enables the interaction on the second view propagated to the object of interaction in the original 3D scene, where the second view utilizes a mix of real time and offline spatial mapping and understanding details.

Unlike related art methods and systems, the electronic device allows user movement towards a zoomed second view area, where the second view merges with the first view if both zoom or interaction level or distance becomes almost same.

Referring now to the drawings, and more particularly to FIGS. 2A through 5, there are shown preferred embodiments.

Figure 2A:
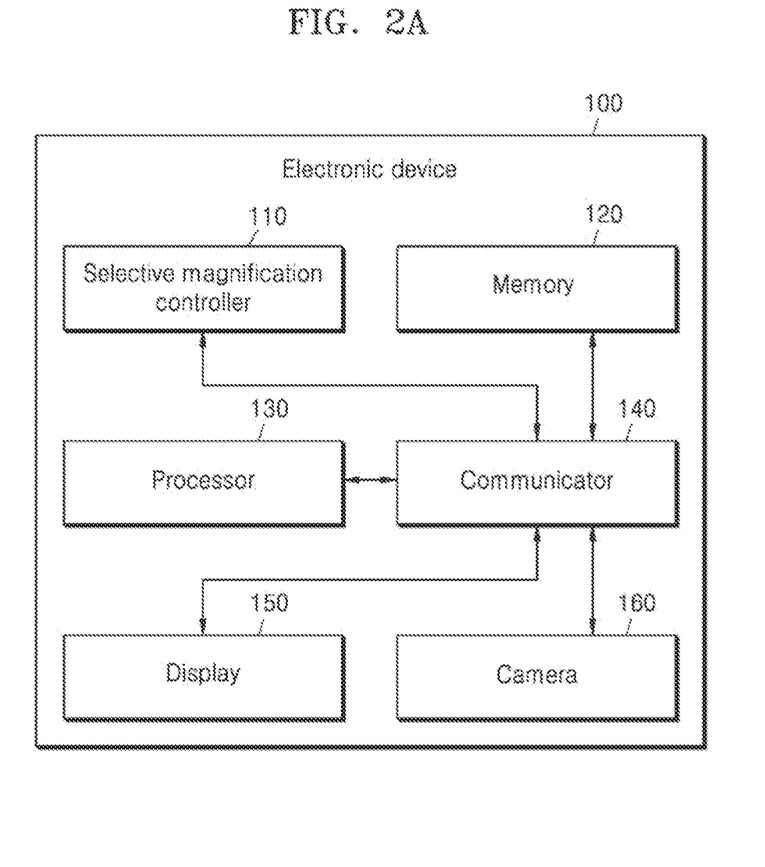
FIG. 2A is a block diagram of an electronic device for selective magnification in a 3D rendering system, according to an embodiment.

FIG. 2A is a block diagram of an electronic device 100 for selective magnification in a 3D rendering system, according to an embodiment as disclosed herein. Examples of the 3D rendering system include an extended reality system, an augmented reality system, and a mixed reality system, etc. Examples of the electronic device 100 include, but are not limited to a smart phone, a tablet computer, a personal digital assistance (PDA), a desktop computer, an Internet of Things (IoT), a wearable device, etc. In an embodiment, the electronic device 100 includes a selective magnification controller 110, e.g., a processor, a microprocessor, etc., a memory 120, a processor 130, a communicator 140, a display 150, and a camera 160. The selective magnification controller 110 operates as the 3D rendering system in the electronic device 100. The selective magnification controller 110 is implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like. For example, the selective magnification controller 110 maybe a part of the processor 130 or maybe a separate device.

The selective magnification controller 110 displays an image (i.e. 3D or 2D image) that includes real world objects on the display 150 such as a Light Emitting Diode (LED) display, a Liquid-Crystal Display (LCD) display, etc. In an embodiment, the selective magnification controller 110 obtains the image from the camera 160 for displaying on the display 150 while the camera captures a preview/video/photo of a scene of a real world. In an embodiment, the selective magnification controller 110) obtains the image for displaying on the display 150 from images and videos stored in the memory 120. In an embodiment, the selective magnification controller 110 obtains the image for displaying on the display 150 from an external source such as a server of online video/photo/social-media applications. The selective magnification controller 110 augments virtual objects on the image. The virtual objects are any graphical 3D objects, not limited by their format, size, material, interaction nature. Examples of the virtual objects include, but not limited to an Emoji, an Animoji, a 3D text, Graphics Language Transmission Format (GLTF) objects, doodles etc. Thus, the selective magnification controller 110 displays a first view of the image including the virtual objects and the real world objects.

The selective magnification controller 110 displays an ROI in the first view as a second view near to a user while preserving the first view. In an embodiment, the selective magnification controller 110 receives a user input to select the ROI from the first view, where the user input includes a touch input, or a gesture, a voice input or any type of multi-modality interaction with combination of more than one interaction modality. Further, the selective magnification controller 110 selects the ROI from the first view based on the user input. For example, the user can give the touch input by marking an area or a boundary of the ROI over the display 150. Then the selective magnification controller 110 selects the ROI from the first view which is marked by the user. In another example, the user can show the gesture of moving a hand towards left of the user, where the selective magnification controller 110 selects a left portion of the first view from a center as the ROI. In another example, the user can give a voice input "select the left portion", then the selective magnification controller 110 selects a left portion of the first view from a center as the ROI. In an embodiment, the electronic device 100 includes a microphone to capture the voice input of the user and to forward the voice input to the selective magnification controller 110. The selective magnification controller 110 converts the voice input to text, determines meaning of the text, and identifies the ROI from the first view based on the meaning of the text. The selective magnification controller 110 overlays a magnified view of the selected ROI over the first view as the second view.

In an embodiment, the selective magnification controller 110 determines a user interaction history on the virtual and/or real world objects using a learning or deterministic based method. Further, the selective magnification controller 110 predicts a user intent to select the ROI from the first view based on the user interaction history. Further, the selective magnification controller 110 selects the ROI from the first view based on the user intent. Further, the selective magnification controller 110 overlays the magnified view of the selected ROI over the first view as the second view. In an example scenario in which the first view includes the virtual object of a coffee cup, and real world word objects such as a mango tree, a car, and a house. Consider, the user mostly uses the virtual object of the coffee cup to augment in video calls. The selective magnification controller 110 identifies that the user interacts mostly with the virtual object of the coffee cup based on the user interaction history. Further, the selective magnification controller 110 predicts that the user intent to select the ROI from the first view that contains the virtual object of the coffee cup. Then the selective magnification controller 110 selects the ROI from the first view that contains the virtual object of the coffee cup.

In an embodiment, the selective magnification controller 110 determines a context including an object in focus of the camera 160 using the learning or deterministic based method. Further, the selective magnification controller 110 selects the ROI from the first view based on the context. Further, the selective magnification controller 110 overlays the magnified view of the selected ROI over the first view as the second view.

In an embodiment, the selective magnification controller 110 identifies a position of the second view to overlay on the first view. Further, the selective magnification controller 110 determines a size of the second view to overlay on the first view. Further, the selective magnification controller 110 overlays the second view on the first view based on the identified position and the determined size. In an embodiment, the selective magnification controller 110 identifies the position and the size of the second view based on a size and a position of objects in the first view near to the user which is convenient for the user to view. In an embodiment, the selective magnification controller 110 allows the user to increase/decrease the size of the second view, zoom in/out the second view, and change the position of the second view based on a user input on the second view.

The selective magnification controller 110 receives a user interaction on the second view, where the user interaction can be a touch interaction, a gesture-based interaction, a voice interaction or any type of multi-modality interaction with combination of more than one interaction modality. The selective magnification controller 110 generates interaction on the first view corresponding to the user interaction received on the second view.

Consider an example scenario, the second view and the first view contain the virtual object of the coffee cup. The virtual object of the coffee cup is close to the user in the second view due to the magnified view, whereas the virtual object of the coffee cup is far away from the user in the first view. Consider, the user provides the touch interaction of sliding motion on the virtual object of the coffee cup in the second view. The selective magnification controller 110 changes a position and/or orientation of the virtual object of the coffee cup based on the touch interaction of the user. Concurrently, the selective magnification controller 110 changes a position and/or orientation of the virtual object of the coffee cup in the first view of the same amount of changes that occur in the first view.

The memory 120 stores the images and videos. The memory 120 stores instructions to be executed by the processor 130. The memory 120 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 120 may, in some examples, be considered a non-transitory storage medium. The term "non-transitory" may indicate that the storage medium is not embodied in a carrier wave or a propagated signal. However, the term "non-transitory" should not be interpreted that the memory 120 is non-movable. In some examples, the memory 120 can be configured to store larger amounts of information than its storage space. In certain examples, a non-transitory storage medium may store data that can, over time, change (e.g., in Random Access Memory (RAM) or cache). The memory 120 can be an internal storage unit or it can be an external storage unit of the electronic device 100, a cloud storage, or any other type of external storage.

The processor 130 is configured to execute instructions stored in the memory 120. The processor 130 may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor 130 may include multiple cores to execute the instructions. The communicator 140 is configured for communicating internally between hardware components in the electronic device 100. Further, the communicator 140 is configured to facilitate the communication between the electronic device 100 and other devices via one or more networks (e.g. Radio technology). The communicator 140 includes an electronic circuit specific to a standard that enables wired or wireless communication.

Although FIG. 2A shows the hardware components of the electronic device 100 but it is to be understood that other embodiments are not limited thereon. In other embodiments, the electronic device 100 may include less or more number of components. Further, the labels or names of the components are used only for illustrative purpose and does not limit the scope of the invention. One or more components can be combined together to perform same or substantially similar function for selective magnification in the 3D rendering system.

Figure 2B:
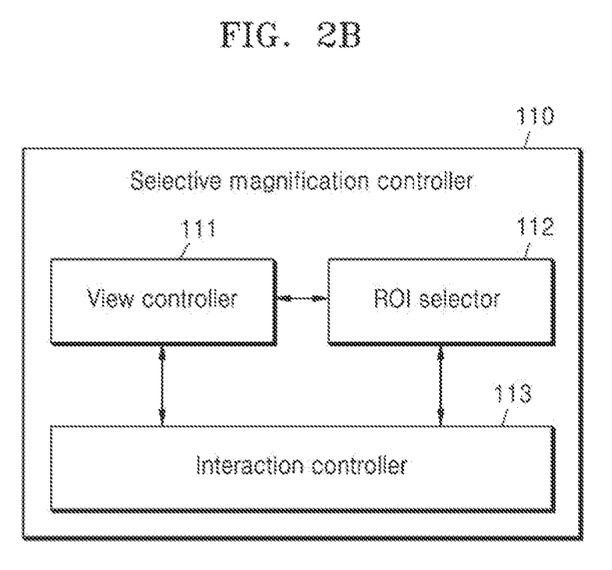
FIG. 2B is a block diagram of a selective magnification controller for generating interaction on a first view corresponding to a user interaction received on a second view, according to an embodiment.

FIG. 2B is a block diagram of the selective magnification controller 110 for generating the interaction on the first view corresponding to the user interaction received on the second view, according to an embodiment as disclosed herein. In an embodiment, the selective magnification controller 110 includes a view controller 111, an ROI selector 112, and an interaction controller 113.

The view controller 111, the ROI selector 112, and an interaction controller 113 are implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

The view controller 111 displays the image includes real world objects on the display 150. In an embodiment, the view controller 111 obtains the image from the camera 160 or the memory 120 or an external source.

The ROI selector 112 displays the ROI in the first view as the second view near to the user while preserving the first view. In an embodiment, the ROI selector 112 receives the user input to select the ROI from the first view. Further, the ROI selector 112 selects the ROI from the first view based on the user input. In an embodiment, the ROI selector 112 determines the user interaction history on the virtual and/or real world objects. Further, the ROI selector 112 predicts the user intent to select the ROI from the first view based on the user interaction history. Further, the ROI selector 112 selects the ROI from the first view based on the user intent. In an embodiment, the ROI selector 112 determines the context including an object in focus of the camera 160. Further, the ROI selector 112 selects the ROI from the first view based on the context. The ROI selector 112 overlays the magnified view of the selected ROI over the first view as the second view.

In an embodiment, the ROI selector 112 identifies the position of the second view to overlay on the first view. Further, the ROI selector 112 determines the size of the second view to overlay on the first view. Further, the ROI selector 112 overlays the second view on the first view based on the identified position and the determined size. In an embodiment, the ROI selector 112 identifies the position and the size of the second view based on the size and the position of the objects in the first view near to the user which are convenient for the user to view.

The interaction controller 113 allows the user to increase/decrease the size of the second view, zoom in/out the second view, and change the position of the second view based on a user input on the second view. The interaction controller 113 receives the user interaction on the second view. The interaction controller 113 generates the interaction on the first view corresponding to the user interaction received on the second view.

Although FIG. 2B shows the hardware components of the selective magnification controller 110 but it is to be understood that other embodiments are not limited thereon. In other embodiments, the selective magnification controller 110 may include less or more number of components. Further, the labels or names of the components are used only for illustrative purpose and does not limit the scope of the invention. One or more components can be combined together to perform same or substantially similar function for generating the interaction on the first view corresponding to the user interaction received on the second view.

Figure 3:
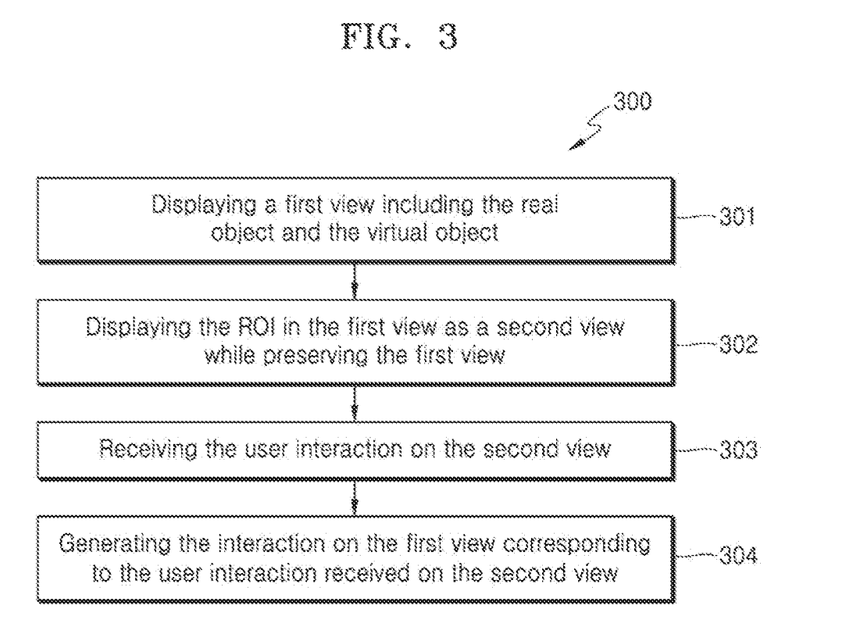
FIG. 3 is a flow diagram illustrating a method for selective magnification in the 3D rendering system, according to an embodiment.

FIG. 3 is a flow diagram 300 illustrating a method for selective magnification in the 3D rendering system, according to an embodiment as disclosed herein. In an embodiment, the method allows the selective magnification controller 110 to perform steps 301 to 304. At step 301, the method includes displaying the first view including the real world objects and the virtual objects. At step 302, the method includes displaying the ROI in the first view as the second view near to the user while preserving the first view. At step 303, the method includes receiving the user interaction on the second view. At step 304, the method includes generating the interaction on the first view corresponding to the user interaction received on the second view.

The various actions, acts, blocks, steps, or the like in the flow diagram 300 may be performed in the order presented, in a different order or simultaneously. Further, in some embodiments, some of the actions, acts, blocks, steps, or the like may be omitted, added, modified, skipped, or the like without departing from the scope of the invention.

Figure 4A:
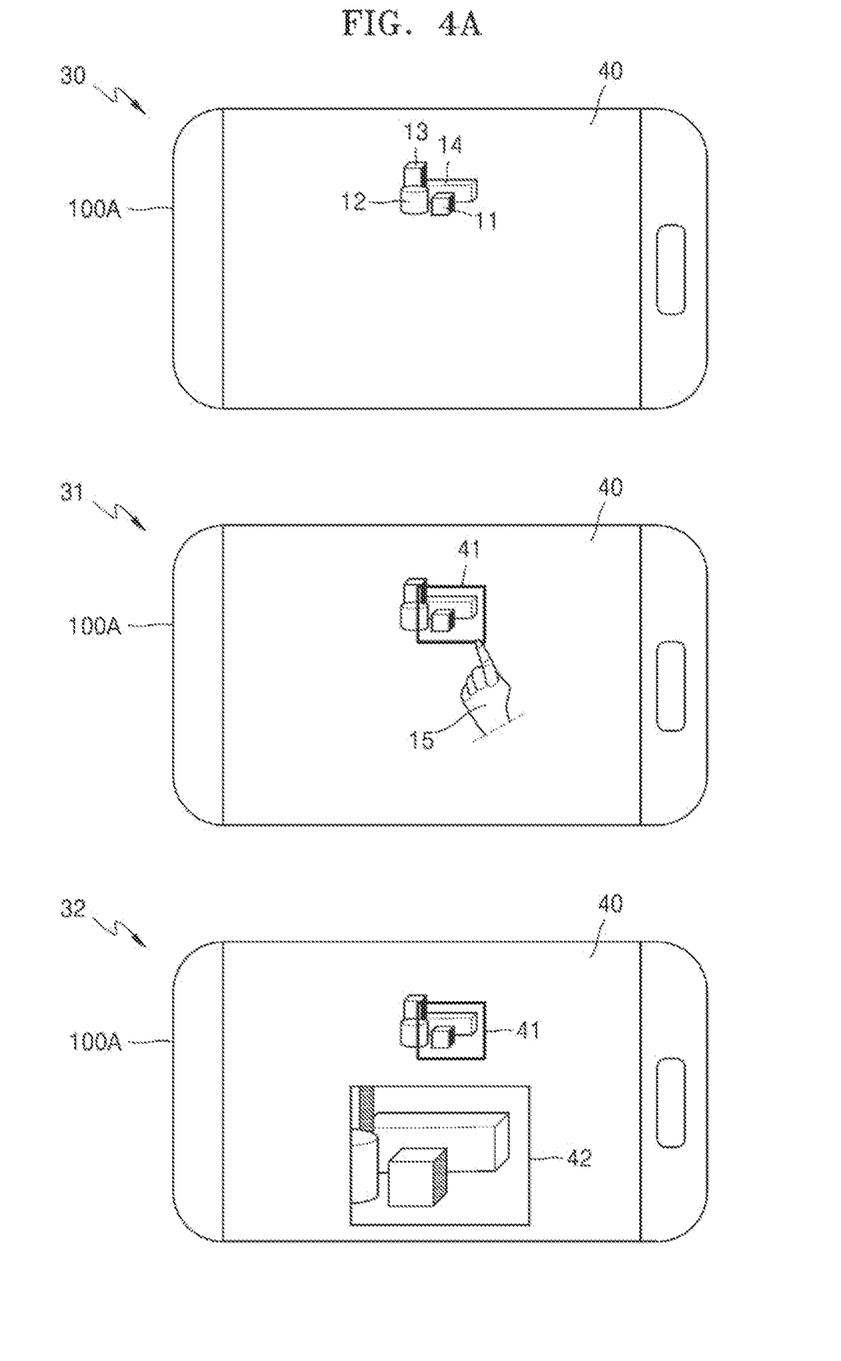
FIGS. 4A and 4B illustrate an example of selectively magnifying objects in the 3D rendering system, according to an embodiment.
Figure 4B:
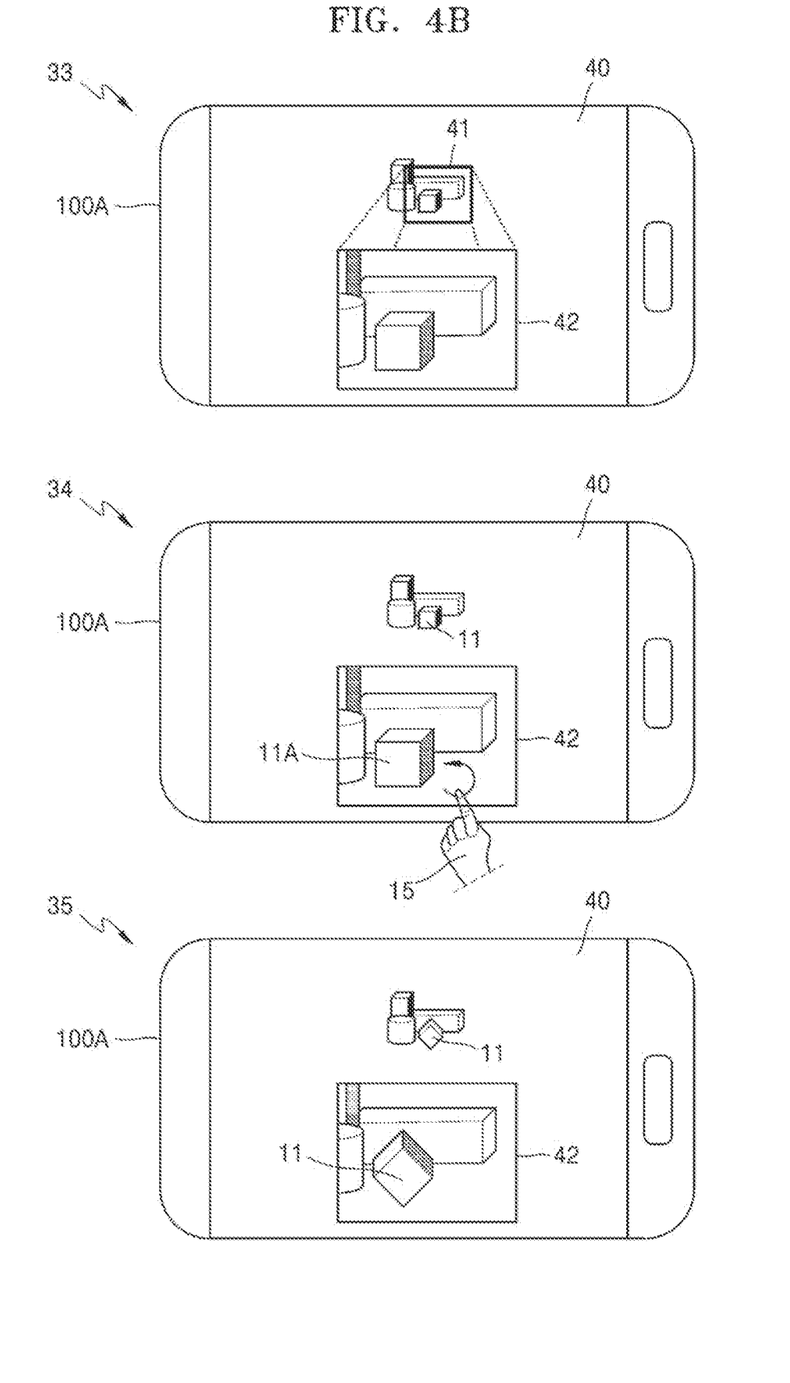

FIGS. 4A and 4B illustrate an embodiment of selectively magnifying the objects in the 3D rendering system, according to an embodiment as disclosed herein. A smartphone 100A is the electronic device 100 in an embodiment. As shown in 30 of FIG. 4A, the smartphone 100A displays a first view 40 includes a virtual object 11 along with real world objects 12 to 14 on the display of the smartphone 100A, where all the objects 11 to 14 are far away from the user 15. Consider, the user 15 marks the border of the ROI 41 on the first view 40 by giving the touch input on the display of the smartphone 100A as shown in 31. The smartphone 100A identifies the ROI 41 in the first view 40 based on the touch input on the display. Further, the smartphone 100A enlarges the ROI 41 and displays the enlarged ROI 41 as the second view 42 near to the user 15 while preserving the first view 40 as shown in 32.

In an embodiment, the user 15 can use a pull gesture to front/left/right to mark location of rendering of the second view 42 at a predefined distance. Further, the smartphone 100A renders the second view 42 on user designated location. As shown in 33 of FIG. 4B, the smartphone 100A remaps the second view 42 to the ROI 41 and configures the objects 11 to 14 in the ROI 41 to follow the interaction being applied on the enlarged view of the objects 11 to 14 in the second view 42. Now, the user 15 can easily view and differentiate all the objects 11 to 14 in the second view 42 due to the magnification and separately interacting with the virtual object 11 in the second view 42 as shown in 34. Further, the smartphone 10 changes an orientation of the virtual object 11 in the second view 42 as well as the virtual object 11 in the first view 40 together based on the user interaction as shown in 35.

Figure 5:
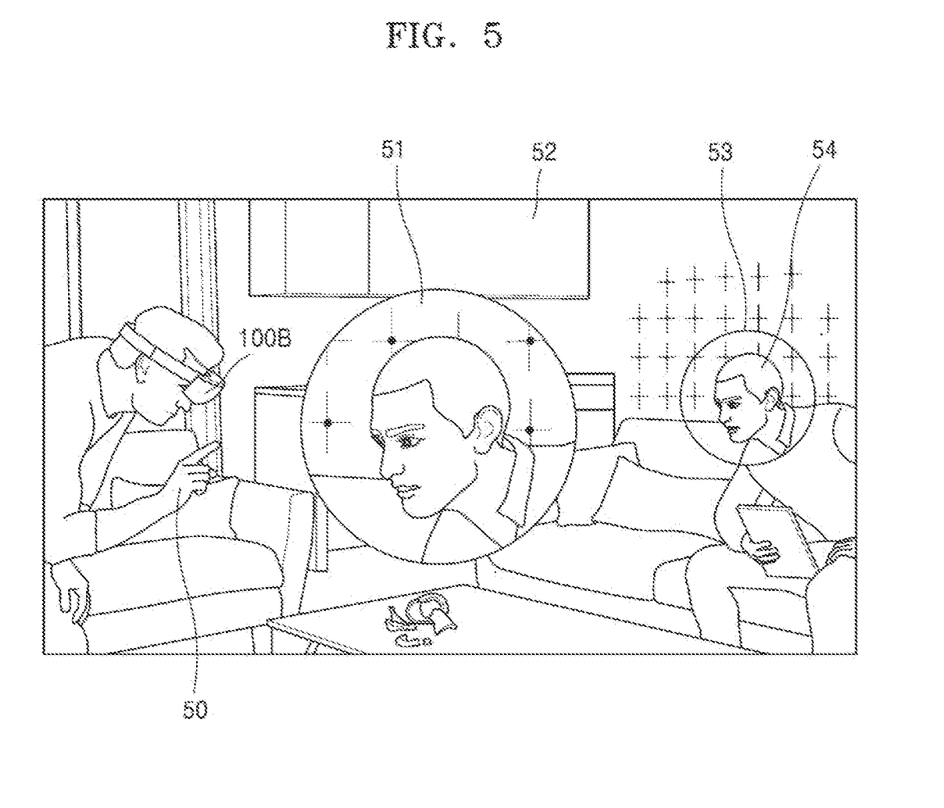
FIG. 5 illustrates an example scenario of selectively magnifying the objects in the 3D rendering system, according to an embodiment.

FIG. 5 illustrates an example scenario of selectively magnifying the objects in the 3D rendering system, according to an embodiment as disclosed herein. Consider, a user 50 wears an AR glass 100B which is the electronic device 100 in the example scenario. The AR glass 100B augments an AR object 54 of a man in a display of the AR glass 100B, such that the user 50 can see the first view includes AR object 54 that is present in a real world 52. The user 50 shows the gesture to select the ROI 53 including a head portion of the AR object 54 of the man. In response to identifying the ROI 53, the AR glass 100B renders the enlarged/magnified view 51 of the ROI 53 near to the user as shown in FIG. 5. Further, the user can interact with the enlarged/magnified view 51 of the AR object 54, where the AR glass 100B generates the same interaction on the AR object 54 present in the ROI 53.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

What is claimed is:

1. A method for selective magnification in a three-dimensional (3D) rendering system, the method comprising:
    displaying, by an electronic device, a first view comprising at least one real world object and at least one virtual object;
    receiving, by the electronic device, a user input for selecting at least one object from among the at least one real world object and the at least one virtual object comprised in the first view;
    setting, by the electronic device, a region of interest (ROI) comprising the selected at least one object based on the received user input;
    displaying, by the electronic device, a magnified view of the ROI by overlaying the magnified view over the first view as a second view, while displaying the first view;
    receiving, by the electronic device, a user interaction on the second view; and
    generating, by the electronic device, interaction on the first view corresponding to the user interaction received on the second view.

2. The method as claimed in claim 1, wherein the 3D rendering system includes at least one from among an extended reality system, an augmented reality system, and a mixed reality system.

3. The method as claimed in claim 1, wherein
    the user input comprises at least one from among a touch input, a gesture, a voice input, and any type of multi-modality interaction with combination of more than one interaction modality.

4. The method as claimed in claim 1, wherein the setting of the ROI further comprises:
    predicting, by the electronic device, a user intent to select the at least one object from the first view based on a user interaction history; and
    setting, by the electronic device, the ROI from the first view based on the user intent.

5. The method as claimed in claim 1, wherein the setting of the ROI further comprises:
    determining, by the electronic device, a context comprising an object in focus in the first view; and
    setting, by the electronic device, the ROI from the first view based on the context.

6. The method as claimed in claim 5, wherein the displaying of the magnified view of the ROI further comprises:
    identifying, by the electronic device, a position where the second view is to be overlaid on the first view;
    determining, by the electronic device, a size of the second view to overlay on the first view; and
    overlaying, by the electronic device, the second view on the first view based on the identified position and the determined size.

7. The method as claimed in claim 1, wherein the user interaction comprises at least one from among a touch interaction, a gesture-based interaction, a voice interaction, and any type of multi-modality interaction with combination of more than one interaction modality.

8. An electronic device for selective magnification in a three-dimensional (3D) rendering system, the electronic device comprising: a display; a region of interest (ROI) selector configured to receive a user input for setting a ROI; a memory which stores at least one instruction; and a processor which, by executing the at least one instruction, is configured to: control the display to display a first view comprising at least one real world object and at least one virtual object; receive, through the ROI selector, a user input for selecting at least one object from among the at least one real world object and the at least one virtual object comprised in the first view; set the ROI comprising the selected at least one object based on the received user input; control the display to display a magnified view of the ROI by overlaying the magnified view over the first view as a second view while displaying the first view; receive a user interaction on the second view; and generate interaction on the first view corresponding to the user interaction received on the second view.

9. The electronic device as claimed in claim 8, wherein the 3D rendering system comprises at least one from among an extended reality system, an augmented reality system, and a mixed reality system.

10. The electronic device as claimed in claim 8, wherein
    the user input comprises at least one from among a touch input, a gesture, a voice input, and any type of multi-modality interaction with combination of more than one interaction modality.

11. The electronic device as claimed in claim 8, wherein the processor is further configured to:
    predict a user intent to select the at least one object ROI from the first view based on a user interaction history; and
    set the ROI from the first view based on the user intent.

12. The electronic device as claimed in claim 8, wherein the processor is further configured to:
    determine a context comprising an object in focus in the first view; and
    set the ROI from the first view based on the context.

13. The electronic device as claimed in claim 12, wherein the processor is further configured to:
    identify a position where the second view is to be overlaid on the first view;
    determine a size of the second view to overlay on the first view; and
    overlay the second view on the first view based on the identified position and the determined size.

14. The electronic device as claimed in claim 8, wherein the user interaction comprises at least one from among a touch interaction, a gesture-based interaction, and a voice interaction and any type of multi-modality interaction with combination of more than one interaction modality.

* * * * *